United States Patent [19]

Jang

[11] Patent Number: 4,827,799

[45] Date of Patent: May 9, 1989

[54] VARIABLE PLANETARY TRANSMISSION FOR A MOTORCYCLE OR REMOTE-CONTROL CAR

[76] Inventor: Lian-Sheng Jang, No 23, Alley 103, Lane 173, Hsiang-Yang Rd., Feng-Yuan City, Taichung Hsien, Taiwan

[21] Appl. No.: 204,630

[22] Filed: Jun. 9, 1988

[51] Int. Cl.$^4$ ............................ F16H 3/74; F16H 3/44
[52] U.S. Cl. .............................. 74/752 E; 74/752 B; 74/781 R
[58] Field of Search ............. 74/752 E, 752 R, 752 B, 74/781 R

[56] References Cited

U.S. PATENT DOCUMENTS

| | | | |
|---|---|---|---|
| 2,189,220 | 2/1940 | Osborne | 74/752 E |
| 3,063,309 | 11/1962 | Grattan | 74/752 B X |
| 3,382,736 | 5/1968 | Abbott | 74/781 R X |
| 3,670,597 | 6/1972 | Grattan | 74/752 E |
| 3,939,734 | 2/1976 | Blanchette et al. | 74/752 E |
| 3,962,934 | 6/1976 | Boutin | 74/752 E |
| 4,273,008 | 6/1981 | Ishihara et al. | 74/752 E |

FOREIGN PATENT DOCUMENTS

| | | | |
|---|---|---|---|
| 53-113967 | 10/1978 | Japan | 74/752 E |
| 53-115455 | 10/1978 | Japan | 74/752 E |
| 56-42753 | 4/1981 | Japan | 74/752 E |

*Primary Examiner*—Dirk Wright
*Assistant Examiner*—Christopher Campbell
*Attorney, Agent, or Firm*—Arnold, White & Durkee

[57] ABSTRACT

An infinitely variable planetary transmission is used in a vehicle, such as motorcycle and remote-control model car. The transmission includes a driven shaft journalled within the end bore of an input shaft. A sun gear is sleeved rigidly on the driven shaft. A planet gear carrier is sleeved rotatably on the driven shaft and serves as a power output member. A first centrifugal clutch is interposed between a ring gear and the input shaft so that, when the rotational speed of the input shaft is increased, the ring gear rotates synchronously with the input shaft. A set of planet gears are mounted rotatably on the carrier and meshed with the ring and sun gears. A second centrifugal clutch includes friction shoes mounted on the carrier, and a rim clutch sleeved rigidly on the driven shaft. A uni-directional bearing limits the driven shaft to rotate only in the same direction as the input shaft. When the input shaft rotates at a low speed, the sun gear is fixed by the limiting action of the unidirectional bearing so that the rotational speed ratio of the carrier to the input shaft is low. When the input shaft rotates at a high speed, the second centrifugal clutch interengages the carrier and the driven shaft so that the ring and sun gears rotate in the same direction, achieving a high rotational speed ratio of the carrier to the input shaft.

1 Claim, 4 Drawing Sheets

VARIABLE PLANETARY TRANSMISSION FOR A MOTORCYCLE OR REMOTE-CONTROL CAR

BACKGROUND OF THE INVENTION

This invention relates to a transmission for a vehicle, and more particularly to an infinitely variable planetary transmission for a motorcycle or remote-control model car.

In FIG. 1, a typical transmission 10 for a vehicle, such as motorcycle and remote-control model car is shown. The transmission 10 includes a starting wheel 11, a main shaft 12, and a centrifugal clutch which consists of a plurality of friction shoes 14, and a rim clutch 15. When the starting wheel 11 is rotated, the main shaft 12 rotated so that the power of an engine 13 is output through the main shaft 12. When the rotational speed of the main shaft 12 reaches a predetermined value, the friction shoes 14 move radially outwardly to engage with the rim clutch 15 so as to rotate the same synchronously with the main shaft 12. An active gear 16 integral with the rim clutch 15 will drive a reactive gear 17 from which the power is output. When the fixed rotational speed ratio of the reactive gear 17 to the active gear 16 is high, it is difficult to start the vehicle. When the fixed rotational speed ratio of the respective gear 17 to the active gear 16 is low, the maximum speed of the vehicle is limited.

SUMMARY OF THE INVENTION

It is therefore the main object of this invention to provide an infinitely variable planetary transmission for a motorcycle or remote-control model car.

According to this invention, an infinitely variable transmission is used in a vehicle, such as motorcycle and remote-control model car. The transmission includes an input shaft having a bore formed in its output end surface, and a driven shaft journalled within the bore of the input shaft at an end thereof. A first centrifugal clutch includes a set of first heavy expanding friction shoes mounted radially movably on an output end portion of the input shaft, and a first rim clutch surrounding the first friction shoes and coaxial with the input shaft. When the rotational speed of the input shaft reaches a first value, the first friction shoes can move radially outwardly to engage with the first rim clutch so as to rotate the first rim clutch synchronously with the input shaft. A planetary gear train includes a ring gear provided on an internal surface of the first rim clutch, a sun gear sleeved rigidly on the driven shaft, a planet gear carrier sleeved rotatably on the driven shaft, a set of planet gears mounted rotatably on the carrier and meshed with the ring and sun gears. A second centrifugal clutch includes a set of second heavy expanding friction shoes mounted radially movably on the carrier, and a second rim clutch sleeved rigidly on the driven shaft. When the rotational speed of the carrier reaches a second value, the second friction shoes can move radially outwardly to engage with the second rim clutch so as to rotate the second rim clutch and hence the driven shaft synchronously with the carrier. A unidirectional bearing is sleeved on the driven shaft and fixed on the vehicle for limiting the driven shaft to rotate only in the same direction as the input shaft.

BRIEF DESCRIPTION OF THE DRAWINGS

Other features and advantages of this invention will become apparent in the following detailed description of a preferred embodiment of this invention with reference to the accompanying drawings in which.

DETAILED DESCRIPTION OF THE PREFERRED EMBODIMENT

Figure 1:
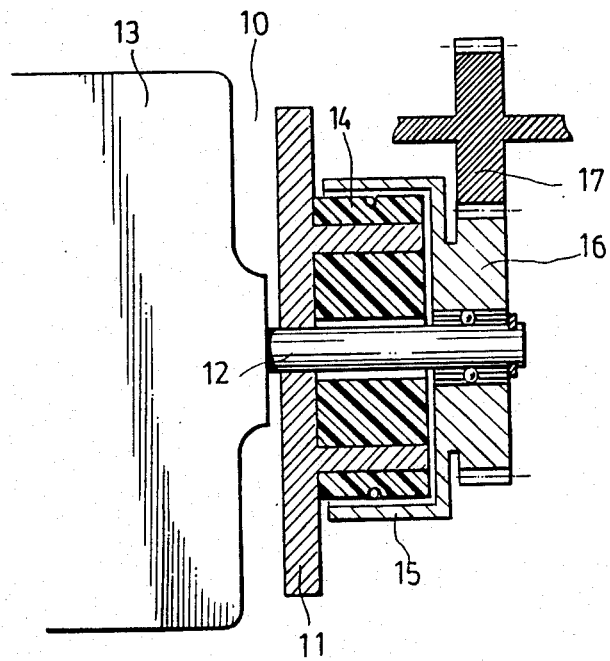
FIG. 1 is a sectional view of a conventional vehicle transmission.
Figure 4:
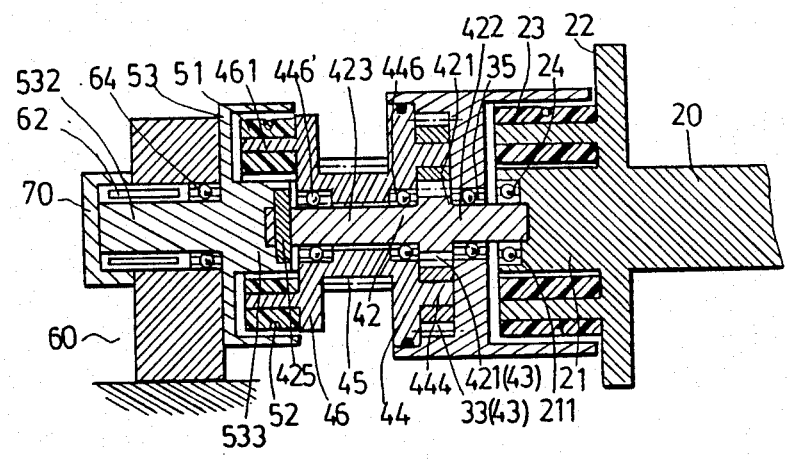
FIG. 4 is a sectional view taken along the line 4—4 in FIG. 2.
Figure 2:
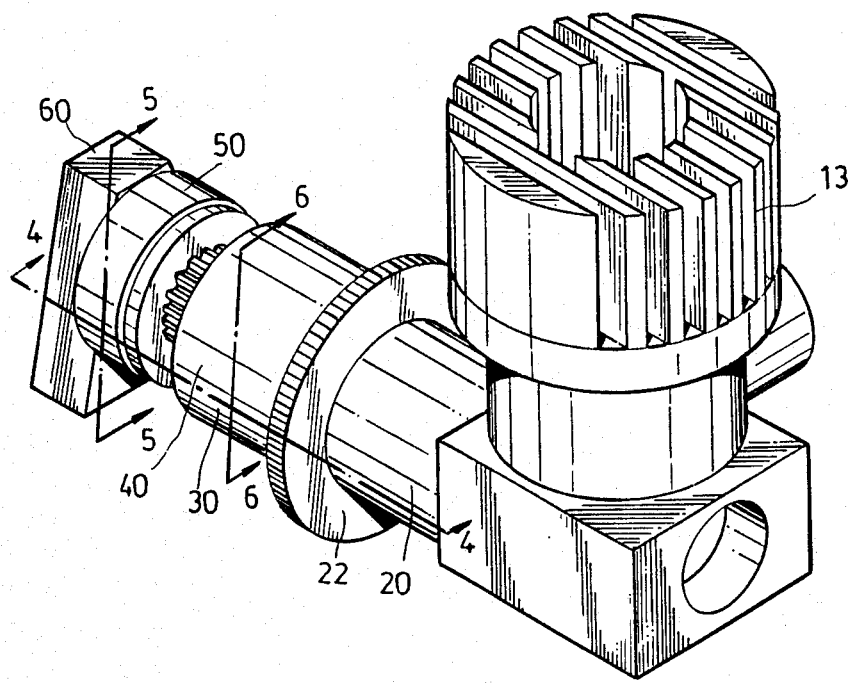
FIG. 2 is a perspective view of an infinitely variable planetary transmission for a motorcycle or remote-control model car.
Figure 3:
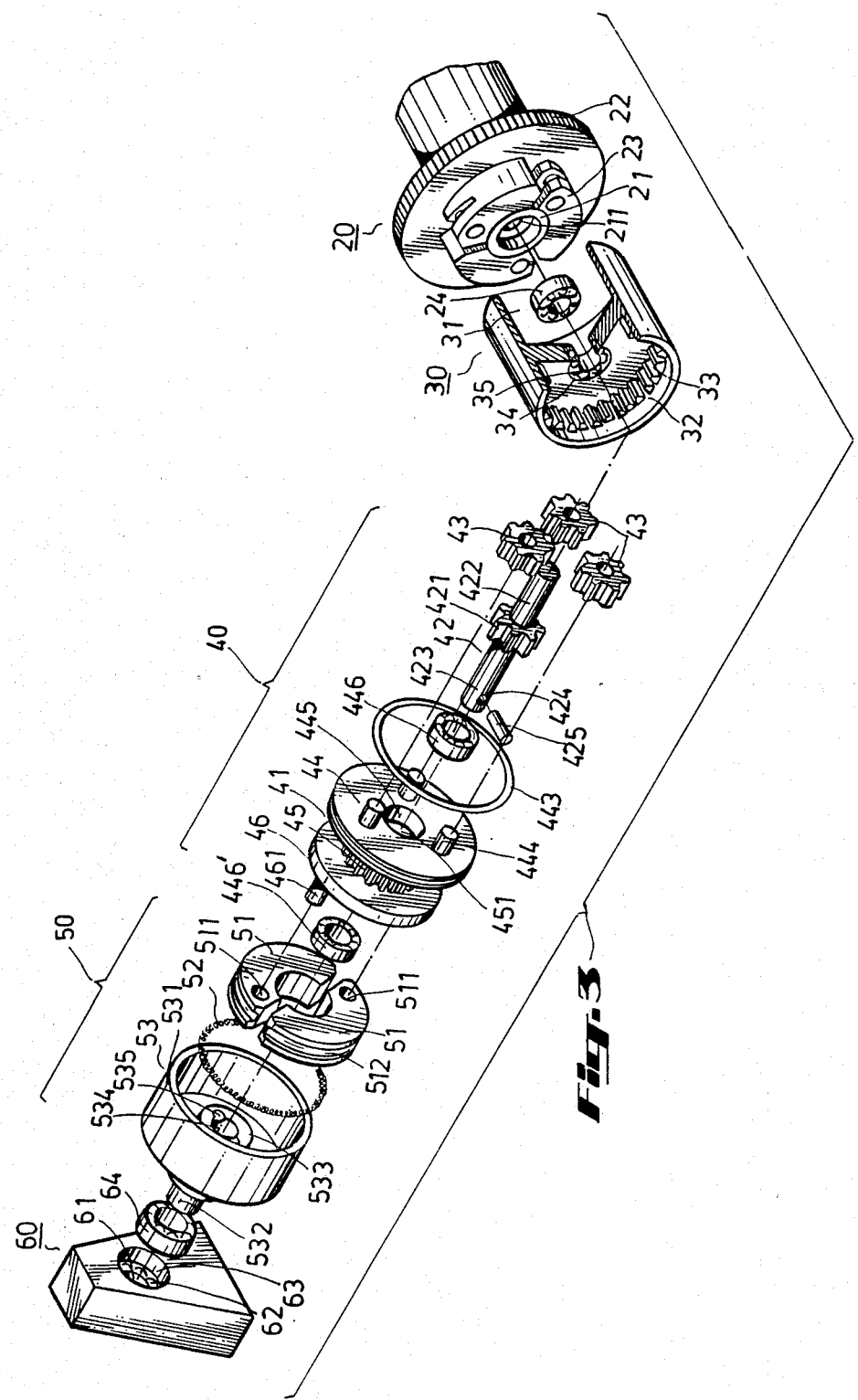
FIG. 3 is an exploded view showing the planetary transmission of this invention.

Referring to FIGS. 2–4, an infinitely variable planetary transmission of this invention may be used in a vehicle, such as motorcycle and remote-control model car. The transmission includes an input shaft unit 20, a right rim clutch 30, a sun and planet gear system 40, a left centrifugal clutch 50, a left end bearing unit 60, and a cap 70.

The input shaft unit 20 is coupled with an engine 13 at its right end and includes an input shaft 21 having a first bearing bore 211 formed in the left end surface of the input shaft 21, a starting wheel 22 sleeved rigidly on the input shaft 21, and three first heavy expanding friction shoes 23 mounted radially movably on the starting wheel 22. A first bearing 24 is mounted within the first bearing bore 211 of the input shaft 21.

The right rim clutch 30 has a large-diameter right bore 31 for the insertion of the first friction shoes 23 therein, a large-diameter left bore 32, an internal ring gear 33 provided on the internal surface of the left end portion of the right rim clutch 30, a small-diameter second bearing bore 34 formed through the right rim clutch 30, and a second bearing 35 mounted within the second bearing bore 34 of the right rim clutch 30.

The sun and planet gear system 40 includes a planet gear carrier 41, a driven shaft 42, and three planet gears 43. The carrier 41 is integrally formed with a right planet gear disk 44, a middle drive gear 45, and a left clutch disk 46 parallel to the planet gear disk 44. The planet gear disk 44 includes an annular groove formed in its outer peripheral surface, an O ring 443 received within the annular groove of the planet gear disk 44 for establishing a liquid-tight seal between the planet gear disk 44 and the right rim clutch 30 to thereby ensure the lubrication of the planetary gear train, three right tongues 444 extending axially outwardly from the planet gear disk 44 and disposed inside the ring gear 33, a third bearing bore 445 formed through the planet gear disk 44, and a third bearing 446 mounted within the third bearing bore 445. The clutch disk 46 includes two left tongues 461 extending axially outwardly therefrom, a fourth bearing bore 462 formed through the clutch disk 46, and a fourth bearing 446' mounted within the fourth bearing bore 462. The driven shaft 42 includes a sun gear 421 sleeved rigidly thereon and aligned with the ring gear 33, a right shaft portion 422 journalled within the first and second bearings 24 and 35, and a left shaft portion 423 journalled within the third and fourth bearings 446 and 446'. The left end portion 423 of the driven shaft 42 is formed therethrough with a pin bore 424 in which a positioning pin 425 is inserted. Each of the planet gears 43 is sleeved rotatably on the corresponding right tongue 444 and meshed with the ring gear 33 and the sun gear 421.

The left centrifugal clutch 50 consists of a pair of left heavy expanding friction shoes 51 of teflon, a spring 52, and a left rim clutch 53. Each of the C-shaped friction shoes 51 has a pivot hole 511 for the insertion of the corresponding left tongue 461 therein, and a C-shaped groove 512 formed in its outer peripheral surface for receiving the spring 52 therein. The left rim clutch 53 includes a sleeve portion 531 surrounding the left friction shoes 52, a rotating shaft portion 532, and a cylindrical tongue 533 extending axially from its center inside of the sleeve portion 531. The cylindrical tongue 533 has a central bore 534 for the insertion of the left end of the driven shaft 42 therein, and a positioning groove 535 formed in its end surface. Because the positioning pin 425 of the driven shaft 42 is engaged closely with the positioning groove 535, the left rim clutch 53 always rotates synchronously with the driven shaft 42.

The left end bearing unit 60 is fixed on the vehicle and has a fifth bearing bore 61 in which a unidirectional bearing 62 is press fit so that the rotating shaft portion 532 of the left rim clutch 53 is journalled within the unidirectional bearing 62. The fifth bearing bore 61 has a counterbore portion 63 in which a fifth bearing 64 is mounted so that the left rim clutch 53 is also journalled within the fifth bearing 64. The unidirectional bearing 62 limits the left rim clutch 53 and hence the driven shaft 42 to rotate only in the same direction as the input shaft 21. That is, the left rim clutch 53 and the driven shaft 42 can only rotate clockwise.

The transmission may be assembled in the following sequence:

1. The left shaft portion 423 of the driven shaft 42 is inserted through the carrier 41 while permitting the sun gear 421 to abut against the third bearing 446. The positioning pin 425 is then inserted tightly into the pin bore 424 of the driven shaft 42. Subsequently, the left friction shoes 51 are respectively sleeved on the left tongues 461 of the clutch disk 46 in such a manner that the spring 52 is placed into the C-shaped grooves 512 of the left friction shoes 51. The sleeve portion 531 of the left rim clutch 53 is sleeved on the left friction shoes 51 while permitting the positioning pin 425 to engage with the positioning groove 535 of the left rim clutch 53.

2. The unidirectional bearing 62 and the fifth bearing 64 are in turn press fit in the fifth bearing bore 61 of the left end bearing unit 60 so that the rotating shaft portion 532 of the left rim clutch 53 is in turn inserted through the fifth bearing 64 and the unidirectional bearing 62. The cap 70 is sleeved tightly on the left end of the unidirectional bearing 62 for sealing the left end of the fifth bearing bore 61 of the left end bearing unit 60.

3. The planet gears 43 are respectively sleeved on the right tongues 444 of the planet gear disk 44 so that they mesh with the sun gear 421 and the ring gear 33.

4. The right shaft portion 422 of the driven shaft 42 is inserted into the first bearing 24 of the input shaft 21, thereby permitting the first friction shoes 23 to be inserted into the right bore 31 of the right rim clutch 30. Finally, the left end bearing unit 60 is welded or screwed to the vehicle.

Figure 6:
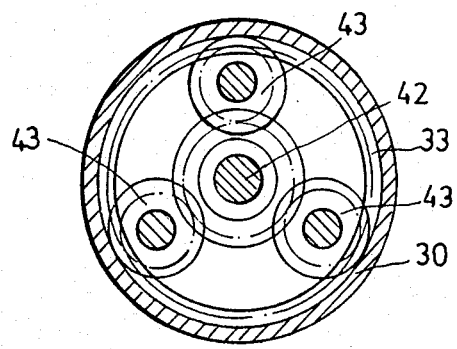
FIG. 6 is a sectional view taken along the line 6—6 in FIG. 2.

Before the engine 13 is started, the right friction shoes 23 are separated from the right rim clutch 30 so that the right rim clutch 30 is stationary. At the same time, only the input shaft 21 rotates clockwise. After the engine 13 has started, the right friction shoes 23 move radially outwardly to engage with the right rim clutch 30 so as to rotate the right rim clutch 30 and hence the ring gear 33 synchronously with the input shaft 21. Referring to FIG. 6, the clockwise rotation of the ring gear 33 causes the planet gears 43 to also rotate clockwise so that the sun gear 421 tends to rotate counterclockwise. However, as described above, because the driven shaft 42 and the sun gear 421 can only rotate clockwise due to the limitation of the unidirectional bearing 62, the sun gear 421 cannot rotate counterclockwise. Accordingly, each of the planet gears 43 rotates about the sun gear 421 but doesn't rotate about its axis so that the carrier 41 rotates clockwise at a low speed. At the same time, the rotational speed of the carrier 41 is too low to engage the left friction shoes 51 with the left rim clutch 53. Because the rotational speed ratio of the carrier 41 to the input shaft 21 is relatively small, a large torque can be output through the drive gear 45 so that the vehicle can be easily started.

Figure 7:
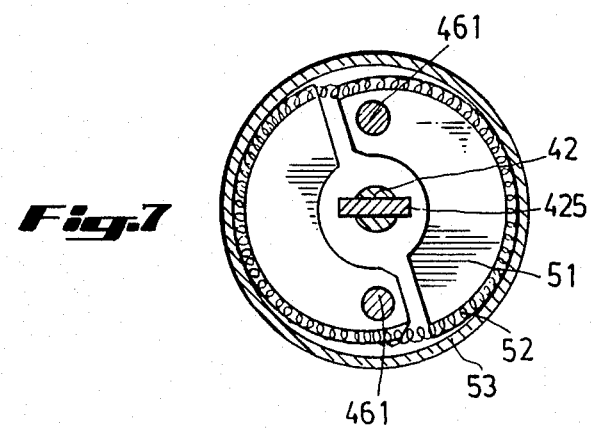
FIG. 7 is a schematic view illustrating the operation of the left centrifugal clutch of the planetary transmission according to this invention.

Referring to FIG. 7, when the rotational speed of the carrier 41 is increased to a predetermined value, the left friction shoes 51 move radially outwardly to engage with the left rim clutch 53 so as to rotate the left rim clutch 53 and hence the driven shaft 42 clockwise synchronously with the carrier 41. In this way, the ring gear 33 rotates clockwise at a higher speed and the sun gear 421 rotates clockwise at a lower speed so that the rotational speed of the carrier 41 is largely increased. That is to say, the rotational speed ratio of the carrier 41 to the input shaft 21 is gradually increased after the left friction shoes 51 have engaged with the left rim clutch 53. The rotational speed of the carrier 41 will gradually increase until it is equal to that of the input shaft 21. A relatively high rotational speed may thus be obtained by the drive gear 45.

Figure 5:
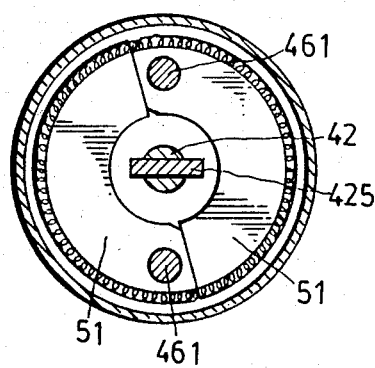
FIG. 5 is a sectional view taken along the line 5—5 in FIG. 2.

When the input shaft 21 is stopped, the left friction shoes 51 are pushed by the spring 52 from the position shown in FIG. 7 to the position shown in FIG. 5.

With this invention thus explained, it is apparent that numerous modifications and variations can be made without departing from the scope and spirit of this invention. It is therefore intended that this invention be limited only as indicated in the appended claims.

I claim:

1. An infinitely variable transmission for a vehicle, said vehicle being either a motorcycle or remote-control car, said transmission comprising:

an input shaft having a bore formed in its output end surface;

a driven shaft journalled within said bore of said input shaft at an end thereof;

a first centrifugal clutch including a set of first heavy expanding friction shoes mounted radially movably on an output end portion of said input shaft, and a first rim clutch surrounding said first friction shoes and coaxial with said input shaft, said first friction shoes being capable of moving radially outwardly to engage with said first rim clutch so as to rotate said first rim clutch synchronously with said first friction shoes when rotational speed of said input shaft reaches a first value;

a planetary gear train including a ring gear provided on an internal surface of said first rim clutch, a sun gear sleeved rigidly on said driven shaft, a planet carrier sleeved rotatably on said driven shaft, a set of planet gears mounted rotatably on said carrier and meshed with said ring and sun gears;

a second centrifugal clutch including a set of second heavy expanding friction shoes mounted radially movably on said carrier, and a second rim clutch sleeved rigidly on said driven shaft, said second friction shoes being capable of moving radially outwardly to engage with said second rim clutch so as to rotate said second rim clutch and hence said driven shaft synchronously with said carrier when rotational speed of said carrier reaches a second value; and a uni-directional bearing sleeved on said driven shaft and adapted to be fixed on said vehicle for limiting said driven shaft to rotate only in the same direction as said input shaft.

* * * * *